United States Patent [19]

Mayor et al.

[11] Patent Number: 5,943,322
[45] Date of Patent: Aug. 24, 1999

[54] COMMUNICATIONS METHOD FOR A CODE DIVISION MULTIPLE ACCESS SYSTEM WITHOUT A BASE STATION

[75] Inventors: Michael A. Mayor, Fort Wayne, Ind.; Paul A. Gilmour, Bloomfield, N.J.

[73] Assignee: ITT Defense, Inc., McLean, Va.

[21] Appl. No.: 08/644,658

[22] Filed: Apr. 24, 1996

[51] Int. Cl.$^6$ .................................................. H04J 13/02
[52] U.S. Cl. .................. 370/280; 370/342; 370/348; 370/350; 375/356; 455/502
[58] Field of Search .................. 370/311, 276–280, 370/282, 293–295, 310, 313, 316–321, 324, 342, 345–347, 350, 335, 447; 375/205, 206, 349, 356, 358, 362, 200; 340/825.08; 379/58–60; 455/31, 38.1, 49.1, 50.1, 51.1, 34.1, 68, 39, 500–502

[56] References Cited

U.S. PATENT DOCUMENTS

| | | | |
|---|---|---|---|
| 5,317,593 | 5/1994 | Fulghum et al. | 370/342 |
| 5,329,558 | 7/1994 | Larsson et al. | 370/350 |
| 5,371,901 | 12/1994 | Reed et al. | 455/69 |
| 5,379,279 | 1/1995 | Backof et al. | 370/350 |
| 5,422,952 | 6/1995 | Kennedy et al. | 370/342 |
| 5,471,650 | 11/1995 | Vexler et al. | 455/69 |
| 5,509,002 | 4/1996 | Baden et al. | 370/342 |
| 5,511,090 | 4/1996 | Denton et al. | 370/342 |
| 5,621,723 | 4/1997 | Walton, Jr. et al. | 370/335 |
| 5,625,653 | 4/1997 | Kaewell, Jr. et al. | 370/350 |

*Primary Examiner*—Douglas W. Olms
*Assistant Examiner*—Seema S. Rao
*Attorney, Agent, or Firm*—Plevy & Associates

[57] ABSTRACT

Personal communications in a code division multiple access system operated without a base is provided with simultaneous transmission of a communications channel and a control channel, each spread by different PN codes. The PN code facilitates restricting communications on the network to a particular conversation mode and between identified radios. Transmissions are performed in a time division duplex manner in 62.5 milliseconds slots. One of the radios initiates transmission and maintains power control and time synchronization normally done by a base station. A network control station can voluntarily or by command transfer control of the network to any of the other radios on the network. Colliding transmissions from more than one radio require the radios to retry transmitting until one of the radios transmits in an earlier time slot. Conversational mode capability is provided by equipping the radio receivers with despreaders in parallel for permitting a receiving radio to separately despread the simultaneously transmitted signals all other radios on the network and responding to each radio transmission individually. Simultaneous voice and data communications can be accomplished by equipping the receivers with despreaders for discriminating voice and data information signals spread by different PN codes.

20 Claims, 3 Drawing Sheets

FIG. 2

| TIME PERIOD | $t_n$ | $t_{n+1}$ | $t_{n+2}$ | $t_{n+3}$ | $t_{n+4}$ | $t_{n+5}$ |
|---|---|---|---|---|---|---|
| S1 TRANSMIT | COMMS CONTROL | | | CTRL SWITCH | | COMMS CONTROL | |
| S1 RECEIVE | | (COMMS) CONTROL | | CTRL SYNCH | | |
| S2 TRANSMIT | | | (COMMS) PTT | | | COMMS CONTROL | |
| S2 RECEIVE | COMMS CONTROL | | CTRL SWITCH | CTRL SYNCH | | |
| S3 TRANSMIT | | | | | | |
| S3 RECEIVE | COMMS CONTROL | | CTRL ACK | | COMMS CONTROL | |
| S4 TRANSMIT | | | | | | |
| S4 RECEIVE | COMMS CONTROL | | CTRL ACK | | COMMS CONTROL | |

COMMUNICATIONS METHOD FOR A CODE DIVISION MULTIPLE ACCESS SYSTEM WITHOUT A BASE STATION

FIELD OF THE INVENTION

The present invention concerns a method for personal communications in a code division multiple access (CDMA) system operated without a base station.

BACKGROUND OF THE INVENTION

Commercial cellular communications systems and personal communications systems often employ known spread spectrum, modulation techniques for multiple access or for increasing the immunity to noise and interference. Spread spectrum techniques make use of a sequential noise-like signal structure with a wide-band of frequencies, for example pseudonoise (PN) codes, to spread the normally narrow-band information signal over the relatively wide-band of frequencies. The receiver by correlating the received spread spectrum signal with the known PN code wave-form, despreads the signal to retrieve the original information signal. Another characteristic of these systems in a multi-user application is the use of a base station to effectively relay communications from user to user. However, the use of a base station is impractical in forward area battlefield communications. There are currently no commercial cellular communications systems working without a base station which is needed to implement the entire billing and accounting process. Without a base station the operator cannot perform effective billing of the conversations carried on through the system.

Base stations in commercial cellular systems are carefully placed in locations where their antennas, usually positioned very high, on the order of ten to thirty feet, can receive and transmit within the base station area or "cell". In the same way, path loss and multi-path effects are measured such that the base station can determine, through elaborate software control, the best allocation of calls to different frequencies within one area or cell. Also, the commercial base station transmits simultaneously through all the channels available to it to all mobiles in its areas. This is usually forty eight (48) channels for cellular systems and twenty four (24) channels for personal communication systems, which transmit anywhere between twenty (20) Watts and fifty (50) Watts. Moreover, Commercial cellular base stations use a control channel, which is a separate frequency in most systems, to continuously monitor the status and transmitted power of all the telephones which are turned on in the cell.

The use of a base station in commercial cellular systems as discussed above is inappropriate for forward area battlefield communications for several important reasons. Under battlefield conditions, equipment cannot be reliably provided nor can access be gained to all desired sites for setting up fixed base stations. A fixed base station radiating watts of power is undesirable and, the use of a separate control channel easily identifiable and capable of being jammed or taken out by an adversary, compromises the security of such a communications system under battlefield conditions. Lastly, use of a fixed or transportable base stations restricts the soldier's communications and associated operations to areas that are covered by the fixed or transportable base stations.

Accordingly, it is an object of the present invention to disclose a method for personal communications in a code division multiple access (CDMA) system operating without a base station.

SUMMARY OF THE INVENTION

The present invention concerns a method for providing personal communications for a network of radios in a code division multiple access system operated without a base station. A communications channel spread by a PN code is simultaneously transmitted with a control channel spread by a different PN code. Addressing of the communications channel and control channel for restricting communications between radios permitted to operate in the network is achieved in part by the PN codes identifying the radio network and each of the radio devices as well as the type of conversation mode for further communications. One of the radios becomes a network control station which initiates communications and maintains power control and time synchronization of the network as a base station would normally function. The network control station can voluntarily or be commanded to transfer power control and time synchronization of the network to any other radio in the network to allow for continued control of the network. Transmissions between the radios on the network are performed in a time division duplex manner in time slots of 62.5 milliseconds. The control channel contains power control information allowing the network control station to adjust the power levels for transmission to all the other radios in the network so as to prevent radios transmitting close to the network control station from overwhelming radios transmitting far from the network control station.

When more than one of the radios attempt to transmit to the control station simultaneously in the same time slot causing a collision of transmissions, each of the radios must retry transmitting until one is able to transmit in an earlier time slot. Conversational mode communications are achieved by having radios with receivers having despreaders in parallel for permitting the network control station to simultaneously receive transmissions from more than one other radio and respond to each of the radios with individual transmissions. The network can also facilitate simultaneous transmission of voice and data by spreading the voice and data signals with different PN codes. The radios receiving these voice and data transmissions have despreaders for discriminating the distinctly spread voice and data signals.

BRIEF DESCRIPTION OF THE DRAWINGS

FIG. 2 is a time line diagram showing the present invention conversational mode capabilities via time division duplexing.

DETAILED DESCRIPTION OF THE INVENTION

Figure 1A:
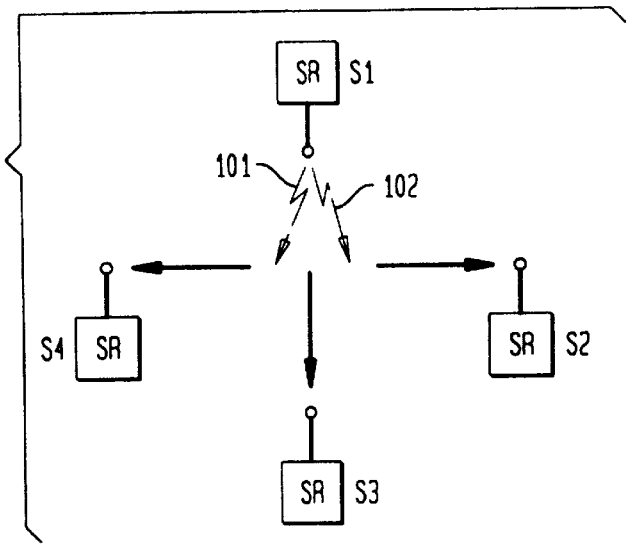
FIGS. 1A, 1B and 1C are schematics of a network of soldier radios operating under the present invention method.

Commercial cellular communication and personal communication systems are composed of base stations and mobile units such as hand held transceivers. For immunity to interference and interception, these communication systems often employ spread spectrum transmission techniques which transmit the information signal in a bandwidth greater than the minimum necessary to send the information. The narrow-band information signal is spread by means of a coded wave-form which is independent of the data, and a synchronized reception with the coded wave-form at the receiver is used for despreading and subsequent data recovery. The coded wave-form or spreading wave-form, which essentially hides the pattern of the information bandwidth, is usually a pseudonoise (PN) sequence which has desired randomness properties and which is available to the cooperating transmitter and receiver, but denied to other undesirable users of the common spectrum.

As is well known, the two most common multiple access techniques are frequency division multiple access (FDMA) and time division multiple access (TDMA). In FDMA, all users transmit simultaneously, but use disjoint frequency bands. In TDMA, all users occupy the same radio frequency (RF) bandwidth, but transmit sequentially in time. When users are allowed to transmit simultaneously in time and occupy the same RF bandwidth as well, code division multiple access (CDMA) provides the capability of separating the signals at the receiver. In a direct sequence form of a CDMA system, each user is given its own PN code for spreading its narrow-band information signal, which is approximately orthogonal with the codes of the other users. The receivers cross-correlate the spread spectrum modulated signal with a replica of the PN code to collapse or despread the signal to the narrow-band occupied by the information signal prior to spreading. Since each user transmits with its own PN code, the receiver correlates received transmission signals with a particular PN code wave-form to despread that particular PN coded transmission and retrieve the original unspread information signal.

Operation of mobile units or radios/telephones in commercial cellular systems and personal communications systems with a base station has been necessary whether the transmission wave forms are analog for old systems and digital for new systems. The analog systems include, among others, Advanced Mobile Phone System (AMPS), Nordic Mobile Telephone (NMT), Total Cellular System (TACS) Japanese NTT and the German C-System. Digital transmission based systems utilizing a base station with mobile units includes among others, the North American Digital Cellular (NADC) system defined in standard IS-54, the European Global System for Mobile Communications (GSM) and, the North American Code Division Multiple Access (CDMA) standard IS-95.

For all of the above systems, the base stations function as both a controller and a relay station for all calls within the base station area of operation. The area of operation is established when the base station is setup and has a very well defined range which varies depending on the makeup of the covered area, i.e. urban, suburban or rural. The base station functions to monitor the transmitted power of the mobile units to ensure that mobile units close to the base station do not overwhelm mobile units far away. In all these systems the base stations transmit a pilot tone which is used by the mobile units as a synchronization element. In digital systems, Code Division Multiple Access systems (CDMA) included, operation with a base station is necessary for a working network of mobile units. In the Time Division Multiple Access (TDMA) systems like NADC and GSM, the base station maintains the necessary time synchronization for the mobile units to receive and correctly decode information. This is also true with the CDMA digital systems, where the base stations also control the mobile units transmitted power. This power control is more crucial in CDMA systems since the signals, by virtue of their sharing the same time-frequency channel, separated only by different PN codes, interfere with each other. In a battlefield environment, loss of the base station renders the network inoperable.

The present invention discloses a method for operating a network of mobile units without a base station by a time division duplex technique in a CDMA system. With such a method the mobile unit initiates the transmission and maintains both the time synchronization and power control necessary for the system to work as a full conversational system. Moreover, the elimination of one or more units, a possibility in battlefield conditions, does not permanently disrupt the operation of the network, since any mobile unit can assume control.

Although the present invention can be used in many different applications where protocols for personal communications without a base station are needed, the present invention is especially suited for use in battlefield conditions where operation without a base station improves the security of field communications and operations. Accordingly the present invention will be described in conjunction with a code division multiple access (CDMA) communications system in a battlefield environment.

The present invention discloses protocols for peer-to-peer communications as well as conversational mode communications in a code division multiple access system without a base station by means of a code control channel. Protocols being a formal set of procedures governing the formal and relative timing between two or more communication sources in a network to initiate or maintain communication. Peer-to-peer communications being interactions between two or more communication sources that operate on the same communications level on a network based on a layered architecture. Conversational mode communications being interactions between two or more users similar to human dialog wherein the users alternatively transmit and receive messages from each other.

To facilitate networking or intercommunication between multiple users or radios, the present invention employs an addressing scheme containing two elements, a frequency and a pseudonoise (PN) code. The frequency for a transmit/receive operation is one of seven centered on a 12 Megahertz (MHz) band in the 1755 to 1850 MHz range. The frequencies may be reused in other networks, depending on the number of networks or "squads". The PN code is a noise like signal with a wide-band of frequencies which spreads the information signal over the wide-band of frequencies. The PN codes identify the following:

- one (1) PN code per network, common to all users or "squad" members;
- fifteen (15) PN codes per network, one (1) PN code per soldier per network, each soldier with his own individual code in the network;
- one (1) PN code per network for the control channel, one control channel per network;
- one (1) PN code for the communication channel, facilitates loading transmission security and communication security variables;
- one (1) PN code for zeroing the radio; and,
- six (6) PN codes available for future use.

Although the present invention utilizes only one (1) control channel per network, more control channels can be utilized for low probability of interception or detection by others outside the network, since there are millions of PN codes available to choose from a code length of at least $2^{31}-1$. None of the above PN codes are reused in other networks. If a soldier should become isolated from his squad and enter an area for which he has no knowledge of local PN codes, he can still use a "guard/cue" channel, understandable in all networks to establish initial contact with friendly forces in the area.

A time division duplexing method is utilized for transmit and receive operations to implement the necessary control functions for operation without a base station. Every single user radio or "soldier radio (SR)" can be a network control station (NCS) in that the transmit and receive channels are switched when control is transferred intentionally or in automatic mode or default mode to another soldier radio. In commercial cellular communications systems with base stations, transmit and receive operations are conducted in a frequency division mode where the telephone transmits and receives simultaneously through a diplexer with proper isolation in two different frequencies separated by 80 MHz. The base station always transmits in a set of frequencies (downlink) and receives in another set of frequencies (uplink). The same is true for cellular telephones where the receive set of frequencies is the downlink and the transmit set of frequencies is the uplink. With the present invention, since each and every SR can become the network control station these frequencies would have to be switched. By using time division duplexing for transmit and receive operations in a code division multiple access system the entire frequency bandwidth can be used, in contrast to base station operations having one set of frequencies for transmitting and another set of frequencies for receiving. With the time division duplexing approach the soldier radio will transmit the communication channel and control channel simultaneously in the same time bandwidth, and will receive the communication channel and control channel simultaneously in the same time bandwidth.

Under the present invention, the soldier radio initiating the transmissions as a network control station, maintains power control and time synchronization normally performed by the base station. The soldier radio transmits and receives alternatively in 62.5 millisecond time slots (16 times a second) which have minimal effect on voice delay. Voice delays in excess of 250 milliseconds start being very noticeable. After the initial synchronization, performed by a short acquisition sequence, time synchronization will be maintained by the control channel. Since there will be no Doppler effect to consider, the main factor in signal acquisition will be the phase delay caused by signal travel time. The signal will take 4.3 microseconds to travel 1.3 kilometers which covers approximately 31 chips at an 8 mega-chips per second (Mcps) rate and, is less than a bit period at 144 kilo-bits per second (kbps) under 6.94 microseconds per bit.

Each soldier radio can be designated as a network control station (NCS). The first NCS will be the soldier radio that initiates the conversation, for example, the squad leader. The soldier radio designated as the NCS will initiate functions (described below) and maintain power control over the network. The NCS functions will automatically be transferred in the event that the current NCS goes out. Based on a prearranged scheme if the current NCS is lost or goes out, the designated follower radio will wait T seconds (based on operational considerations) and then will attempt to reach the NCS radio. If no response is obtained the designated radio will take over the NCS functions. This follower scheme will be done with the second, third, fourth radio, and so on, such that any one of the radios can take over the radio network to facilitate communications. The transfer of NCS functions will also be done on a voluntary basis, if the current NCS radio decides or is ordered to do so.

The NCS radio will have channel control capabilities to assure transmission security requirements imposed on the network. On operator or network computer command, an NCS radio can command another soldier radio to change channels to another PN code which has been loaded into the network according to security procedures. By this method communications established on a security or emergency channel can be quickly switched to a non-emergency channel.

Under the present invention the soldier radio will transmit simultaneously the communications signal spread by one PN code and the control signal spread by a different PN code as noted above. In contrast, current commercial systems operate with a pilot tone control signal used for synchronization that is transmitted 6 decibels below the communications signal. The NCS radio which initiates the communications either by voice control or pre-arranged mission data puts itself in NCS mode. The first time slot for the NCS radio is in transmit mode and as all the other radios are turned on they will be in receive mode for the first time slot. The NCS radio will transmit a synchronization message to facilitate the proper transmit/receive protocol between the NCS radio and all other radios on the network. The transmission will last one time interval, 62.5 milliseconds, and the control information will go to all radios in the network or members of the squad. Both the communications channel and the control channel will be received simultaneously by all the radios. At this point all non NCS radios or squad members are listening to the NCS radio or squad leader.

Power control normally maintained by a base station will be handled by the NCS radio. The control channel transmitted will also contain power control information necessary for operation of the network. The power control information will be updated once every second providing a unique power setting per user. The NCS radio, presumably the squad leader, will start at the lowest power setting and will poll each one of the radios (squad members) in the network and will receive an acknowledgement back. The NCS radio will measure power received from each radio (squad member) and adjust the power appropriately. Before raising the power level the NCS radio will be alerted and request permission, presumably from the squad leader, to do so. This request for permission will also happen if a radio or soldier is not responding.

Power control is maintained within one second intervals by a feed-back control loop using proportional integration and differentiation to smooth control such that power oscillations are maintained within desired limits. In the present invention, the power levels are increased or decreased in one decibel steps starting from 25% of the maximum power setting. Since dismounted radio users such as infantry soldiers will not move faster than five miles per hour the required transmit power for each radio will not change significantly in periods of one second.

The present invention's time division duplexing approach handles the near-far problem associated with code division multiple access systems. A situation is likely to occur where soldier A is very close to soldier B and both of them are far from soldier C which is the NCS radio. In a pure code division multiple access system if soldier A is receiving from soldier C at the same time that soldier B is transmitting, then the receiver front end of soldier A could be saturated by Soldier B transmissions. The present invention time division duplexing approach of having only one radio transmitting at any given time eliminates this transmission saturation problem. Moreover, the time division duplexing approach also minimizes the mutual interference of signals which appear in code division multiple access systems.

The present invention implements a conversational mode with known broadband code division multiple access technology. A restricted conversational mode is implemented initially to allow a conversational mode which does not have the ability to detect multiple simultaneous interrupts. A conversational mode is implemented which is completely analogous to being around a conference table.

Figure 1B:
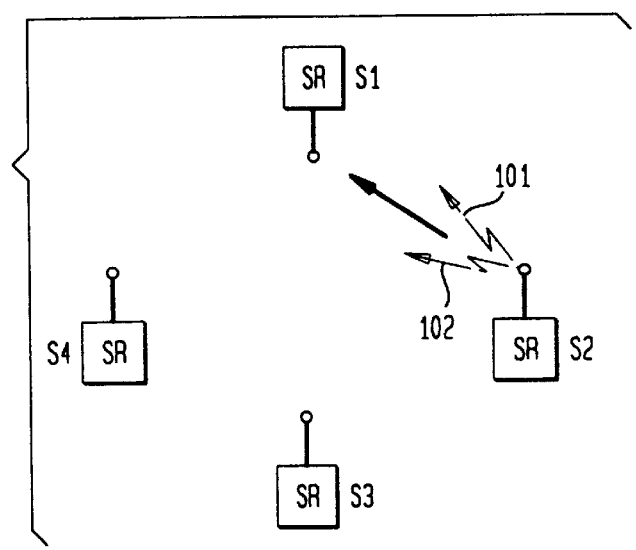
Figure 1C:
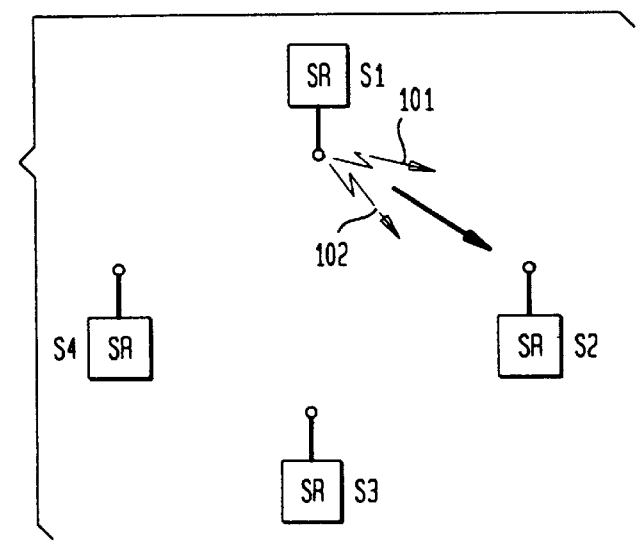

Referring now to FIGS. 1A through 1C, there is shown a network of soldier radios S1, S2, S3, and S4, illustrating in discrete time intervals the flow of communications between users. The time sequencing of transmit and receive operations for implementing a conversation over the network is shown in the time line diagram of FIG. 2. As shown in FIG. 1A, typically the squad leader with the NCS radio S1, initiates the conversation in the first time interval "tn" by transmitting a communications channel 101 and control channel 102, each spread by a separate PN code, while all the other soldier radios S2, S3, and S4 are in receive mode to receive the communications and control channel. In this instance the NCS 101 is transmitting with a PN code that is discernable by all members of the network. In the second time interval, "tn+1", the NCS radio S1 goes to listening mode on both the communication and control channel while soldier radios S2, S3 and S4 go into transmit mode. This will continue until one soldier S2, as shown in FIG. 1A, presses the push to talk (PTT) to transmit a signal to the NCS. The NCS radio recognizes the signal and alerts the user or squad leader that somebody wants to talk. In the third time interval, "tn+2", the squad leader S1 has three options: telling the soldier to go ahead and have everybody listening to the conversation; telling the soldier to go ahead using the individual code, so nobody else listens to the conversation, as shown in FIG. 1C; or telling the soldier to wait by transmitting a control switch signal on the control channel which S2 receives and S3 and S4 acknowledge. During this third time interval, the control switching to achieve the desired conversation mode is transmitted by S1, received by S2 and acknowledged by S3 and S4. During the fourth time interval "tn+3", control synchronization is attained by both S1 and S2 to facilitate continued conversation between S1 and S2. During the fifth time interval "tn+4" S1 and S2 are in transmission mode while S3 and S4 are in receive mode. Either S1 or S2 can initiate further communications on the network during the fifth time interval.

Figure 3:
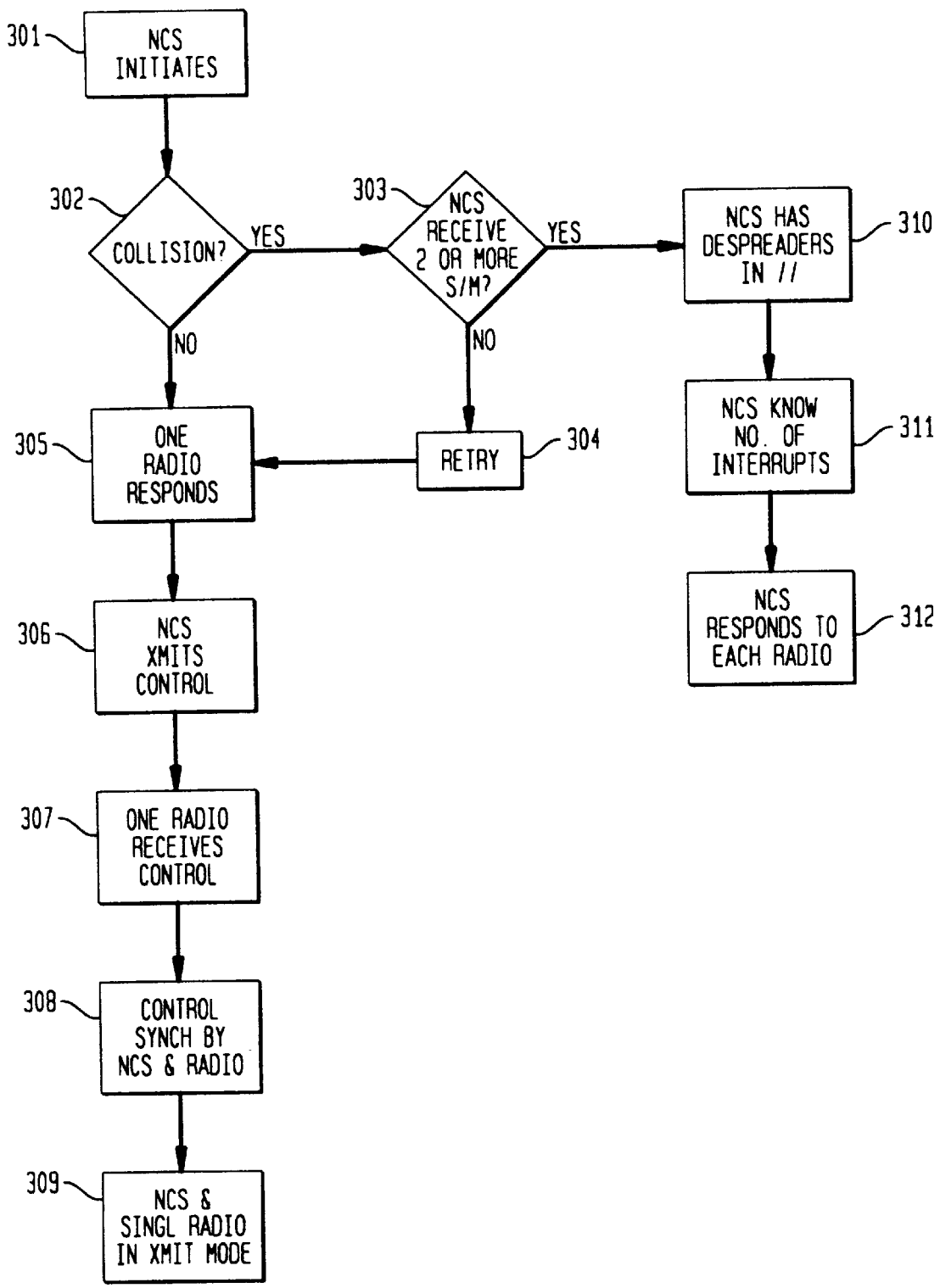
FIG. 3 is a flow chart of the conversational capabilities under the present invention for a code division multiple access system without a base station.

Referring now to FIG. 3, there is shown a flow chart of the transmit and receive operations under the present invention method for personal communications in a CDMA without a base station. As noted before, the NCS soldier radio initiating communications goes into transmit mode while all other soldier radios go into receive mode 301. The NCS and other soldier radios remain in their modes until one of the other soldier radios responds with a push-to-talk (PTT) control transmission. A collision occurs 302 when two or more soldiers such as S2 and S3 trying to talk at the same time push their PTT in the same 62.5 millisecond interval. If the NCS or other radios are not capable of receiving multiple radio transmissions 303, then such a collision is resolved by the soldiers S2 or S3 retrying 304, and one of them such as S2 transmitting in an earlier time interval than the other 305. Alternatively, an automatic routine for retrying transmission in the event of collisions can be added for data transmissions. The NCS radio transmits control switching information 306 which is received by the one radio responding 307 and the other radios acknowledging to facilitate the type of conversation mode desired by the NCS: limited to the NCS and the one radio, or the conversation between the NCS and the one radio heard by the other radios. Control synchronization is attained by both the NCS and one radio and both assume transmit mode for initiating further conversation.

The above discussed conversation mode can be enhanced to provide the NCS radio the ability to despread simultaneously two or more codes 303. This can be accomplished by redesigning the despreader logic array circuit in the receiver of the radios, i.e. adding despreaders in parallel 310. Each of the parallel spreaders would correlate the radio signals with a particular PN code to despread or collapse a radio signal spread by that particular PN code, as noted above. By simultaneously despreading 10 radio signals the NCS radio will know how many interrupts occurred 311 and can answer individually to each of them 312. This enhancement of the conversation mode is analogous to sitting around a conference table when three or more people want to talk at the same time. The person who controls the meeting looks at a selected person and tells that person to go ahead.

Another feature that can be implemented to provide the enhanced conversation mode discussed above is the simultaneous transmission of both voice and data. This can be accomplished by using different PN codes for spreading voice and data on the communications channel because there are many PN codes available. In this mode, by having three despreading functions through specific logic arrays, one for voice communications, one for data communications and one for control channel communications, a full simultaneous transmission of voice and data can be accomplished with the despreading functions. Without the despreading capabilities of the enhanced conversational mode, simultaneous voice and data transmissions can be made, but the voice conversational mode capability will be lost while the data transmission is in progress and being decoded by the receiver.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

We claim:

1. In a method for communicating by multiple subscribers in a code division multiple access system without a base station, each of said multiple subscribers transmitting communication information modulated by a PN code through an information channel, in combination therewith the improvement comprising the additional steps of:

simultaneously transmitting with said communication information control information through a control channel, from an initiating subscriber, for selectively controlling communications between said multiple subscribers; and, modulating said control information by another PN code.

2. The method of claim 1, wherein said control information permits controlling said code division multiple access system by said initiating subscriber as a network control station for initiating and maintaining power control and time synchronization of said code division multiple access system.

3. The method of claim 2, wherein said control information permits transferring said power control and said time synchronization of said code division multiple access system from any one of said subscribers acting as said network control station to any other of said subscribers becoming said network control station for continuing said power control and said time synchronization of said code division multiple access system.

4. The method of claim 2, wherein said communicating by multiple subscribers includes protocols requiring one of said multiple subscribers to initiate communications and becoming said network control station in a transmit mode for transmitting said communication information and said control information to all other said multiple subscribers being in a receive mode for simultaneously receiving said communication information through said information channel and said control information through said control channel.

5. The method of claim 4, further including the step of said network control station commanding another of said multiple subscribers to change said PN code for said control information.

6. The method of claim 3, wherein said control information includes power control information providing a unique power setting for each of said multiple subscribers.

7. The method of claim 5, wherein said network control station polls each of the other said multiple subscribers, receives an acknowledgement back to measure the power received from each of said multiple subscribers and adjusts the power levels for transmission in 1 decibel increments starting from 25 percent of the maximum power setting.

8. A method for providing personal communications for a network of radios in a code division multiple access system operating without a base station, comprising the steps of:

transmitting control information spread by a PN code through a control channel simultaneously with communications information spread by another PN code through a communications channel;

identifying said network and at least one of said radios using said control channel PN code and restricting said personal communications between said radios of said network using said another PN code;

performing transmit/receive operations of said communications information and said control information by each of said radios in a time division duplexing manner;

controlling said network initially by one of said radios, acting as a network control station for maintaining power control and time synchronization over said network; and, transferring control by one of said radios as said network control station to another of said radios to become said network control station for continuing said power control and said time synchronization over said network.

9. The method of claim 8, wherein the frequency of said step of performing transmit/receive operations of said communications information through said communications channel and said control information through said control channel is one of seven centered on a twelve megahertz frequency band in the range of 1755 to 1855 megahertz.

10. The method of claim 8, wherein said step of performing transmit/receive operations of said communications information through said communications channel and said control information through said control channel is performed alternatively in 62.5 millisecond time slots.

11. The method of claim 8, wherein said step of initiating control over said network further includes the step of said network control station commanding another of said radios to change said PN code for said control information.

12. The method of claim 8, wherein said control information includes power control information for allowing said network control station to set a unique power setting for each of said radios to assure that those of said radios transmitting close to said network control station do not overwhelm other of said radios transmitting far away from said network control station.

13. The method of claim 12, wherein said network control station polls each of the other said radios and receives an acknowledgement back to measure the power received from each of said radios and adjust the power levels for transmission in 1 decibel increments starting from 25 percent of the maximum power setting.

14. The method of claim 8, further comprising the step of providing conversational mode communications with said radios having receivers with despreaders in parallel for permitting said network control station to simultaneously receive transmissions from more than one of said radios and respond to each of said more than one of said radios with individual transmissions.

15. The method of claim 8, further comprising the step of providing simultaneous transmission of voice and data by assigning different said PN codes for voice and data on said communications channel and providing said radios with receivers having three despreaders for discriminating voice communications, data communications and control channel communications.

16. A method for providing personal communications for a network of radios in a code division multiple access system operating without a base station by means of simultaneously transmitting communications information through a communications channel with control information through a control channel, between at least two radios, comprising the steps of:

spreading the transmission of each of said communication information through said communications channel and control information through said control channel with different PN codes to enable restricting said personal communications between at least two of said radios, each of said different PN codes being capable of identifying said network and at least one of said radios;

performing transmit and receive operations by each of said radios in a time division duplex manner with discrete time slots;

controlling said network by one of said radios, acting as a network control station for setting said network control station in a transmit mode and all other of said radios in a receive mode in the first of said discrete time slots;

operating in a transmit mode by said network control station and operating in a receive mode by all other of said radios in the second of said discrete time slots for transmitting said communications information through said communications channel and control channel;

responding by one of said radios with a push-to-talk signal to said communications information and control information transmitted by said network control station; and, responding by said network control station to said push-to-talk signal with said control channel for indicating the type of conversation mode for further communications between said network control station and said one of said radios.

17. The method of claim 16, wherein said step of responding by said network control station includes informing said one of said radios to transmit and all other of said radios to receive.

18. The method of claim 16, wherein said step of responding to said one of said radios by said network control station includes informing said one of said radios to transmit so as to restrict communications between said network control station and said one of said radios.

19. The method of claim 16, wherein a collision of transmissions caused by two or more radios attempting to transmit in the same time slot is resolved by said two or more radios retrying transmissions and one of said two or more radios transmitting in an earlier time slot than the other of said two or more radios.

20. The method of claim 16, wherein said step of responding by said network control station to said push-to-talk signal with said control channel includes all other said radios acknowledging said control channel.

* * * * *